US009785462B2

(12) United States Patent
Sheaffer et al.

(10) Patent No.: US 9,785,462 B2
(45) Date of Patent: Oct. 10, 2017

(54) REGISTERING A USER-HANDLER IN HARDWARE FOR TRANSACTIONAL MEMORY EVENT HANDLING

(75) Inventors: Gad Sheaffer, Haifa (IL); Shlomo Raikin, Geva Carmel (IL); Vadim Bassin, Raanana (IL)

(73) Assignee: Intel Corporation, Santa Clara, CA (US)

( * ) Notice: Subject to any disclaimer, the term of this patent is extended or adjusted under 35 U.S.C. 154(b) by 1377 days.

(21) Appl. No.: 12/346,518

(22) Filed: Dec. 30, 2008

(65) Prior Publication Data

US 2010/0169894 A1 Jul. 1, 2010

(51) Int. Cl.
*G06F 9/52* (2006.01)
*G06F 9/46* (2006.01)

(52) U.S. Cl.
CPC .............. *G06F 9/466* (2013.01); *G06F 9/528* (2013.01)

(58) Field of Classification Search
CPC ....................................... G06F 9/528
USPC ........................................ 712/225
See application file for complete search history.

(56) References Cited

U.S. PATENT DOCUMENTS

| 5,008,813 A | 4/1991 | Crane et al. |
| 5,301,294 A | 4/1994 | Kawai et al. |
| 6,216,200 B1 | 4/2001 | Yeager |
| 6,272,602 B1 | 8/2001 | Singhal et al. |
| 6,549,996 B1 | 4/2003 | Manny, IV et al. |
| 6,757,787 B2 | 6/2004 | Xiaowei et al. |
| 7,003,631 B2 | 2/2006 | Rowlands |
| 7,020,738 B2 | 3/2006 | Neiger et al. |
| 7,032,125 B2 | 4/2006 | Holt et al. |
| 7,062,610 B2 | 6/2006 | Conway |
| 7,177,987 B2 | 2/2007 | Doren et al. |
| 7,272,622 B2 | 9/2007 | Sebot et al. |
| 7,395,374 B2 | 7/2008 | Tierney et al. |
| 7,395,382 B1 | 7/2008 | Moir |
| 7,490,199 B2 | 2/2009 | Camiel |
| 7,523,259 B2 | 4/2009 | Pistoulet |
| 7,523,274 B2 | 4/2009 | Ryu et al. |

(Continued)

FOREIGN PATENT DOCUMENTS

| CN | 101059783 A | 10/2007 |
| JP | H11282815 A | 10/1999 |

(Continued)

OTHER PUBLICATIONS

Andrew S. Tanenbaum. "Structured Computer Organization" Prentice Hall, $2^{nd}$ Edition, 1984.*

(Continued)

*Primary Examiner* — Jacob A Petranek
(74) *Attorney, Agent, or Firm* — Nicholson De Vos Webster & Elliott LLP

(57) ABSTRACT

A method and apparatus for registering a user-handler in hardware for transactional memory is herein described. A user-accessible register is to hold a reference to a transactional handler. An event register may also be provided to specify handler events, which may be done utilizing user-level software, privileged software, or by hardware. When an event is detected execution vectors to the transaction handler based on the reference to the transactional handler held in the user-accessible register. The transactional handler handles the event and then execution returns to normal flow.

34 Claims, 4 Drawing Sheets

(56) References Cited

U.S. PATENT DOCUMENTS

| | | |
|---|---|---|
| 7,533,215 B2 | 5/2009 | Faber |
| 7,565,687 B2 | 7/2009 | Noguchi et al. |
| 7,587,615 B2 | 9/2009 | McKenney et al. |
| 7,627,784 B1 * | 12/2009 | Allen ............... G06F 11/3636 714/30 |
| 7,644,239 B2 | 1/2010 | Ergan et al. |
| 7,669,040 B2 * | 2/2010 | Dice ........................ 712/225 |
| 7,783,805 B2 | 8/2010 | Cometto et al. |
| 7,917,701 B2 | 3/2011 | Charra et al. |
| 7,937,535 B2 | 5/2011 | Ozer et al. |
| 8,001,538 B2 | 7/2011 | Gray et al. |
| 8,078,807 B2 | 12/2011 | Saha et al. |
| 8,095,741 B2 | 1/2012 | Gray et al. |
| 8,095,824 B2 | 1/2012 | Gray et al. |
| 8,180,967 B2 | 5/2012 | Rajwar et al. |
| 8,195,832 B2 | 6/2012 | Nam |
| 8,225,297 B2 | 7/2012 | Gray et al. |
| 8,225,377 B2 | 7/2012 | Maffione et al. |
| 8,230,120 B2 | 7/2012 | Ajanovic et al. |
| 8,370,577 B2 | 2/2013 | Sheaffer et al. |
| 8,407,433 B2 | 3/2013 | Wingard et al. |
| 8,555,016 B2 | 10/2013 | Adl-Tabatabai et al. |
| 8,627,014 B2 | 1/2014 | Sheaffer et al. |
| 8,627,017 B2 | 1/2014 | Sheaffer et al. |
| 8,688,917 B2 | 4/2014 | Sheaffer et al. |
| 8,769,212 B2 | 7/2014 | Sheaffer et al. |
| 8,799,582 B2 | 8/2014 | Sheaffer et al. |
| 8,806,101 B2 | 8/2014 | Sheaffer et al. |
| 9,280,397 B2 | 3/2016 | Adl-Tabatabai et al. |
| 2002/0087801 A1 | 7/2002 | Bogin et al. |
| 2003/0005219 A1 | 1/2003 | Royer et al. |
| 2003/0014697 A1 | 1/2003 | Hornung et al. |
| 2003/0131030 A1 | 7/2003 | Sebot et al. |
| 2003/0154296 A1 | 8/2003 | Noguchi et al. |
| 2003/0204670 A1 | 10/2003 | Holt et al. |
| 2003/0217234 A1 | 11/2003 | Rowlands |
| 2004/0064651 A1 | 4/2004 | Conway |
| 2004/0064813 A1 | 4/2004 | Neiger et al. |
| 2004/0093467 A1 | 5/2004 | Shen et al. |
| 2005/0050305 A1 * | 3/2005 | Kissell ................. G06F 8/4442 712/220 |
| 2005/0060495 A1 | 3/2005 | Pistoulet |
| 2005/0060559 A1 | 3/2005 | McKenney |
| 2005/0086446 A1 | 4/2005 | McKenney et al. |
| 2005/0091459 A1 | 4/2005 | Quach et al. |
| 2005/0160230 A1 | 7/2005 | Doren et al. |
| 2005/0160232 A1 | 7/2005 | Tierney et al. |
| 2005/0246487 A1 | 11/2005 | Ergan et al. |
| 2006/0085611 A1 | 4/2006 | Ikeda et al. |
| 2006/0236039 A1 | 10/2006 | Golander |
| 2006/0248259 A1 | 11/2006 | Ryu et al. |
| 2006/0294326 A1 * | 12/2006 | Jacobson et al. ............. 711/156 |
| 2007/0061511 A1 | 3/2007 | Faber |
| 2007/0198521 A1 | 8/2007 | McKenney |
| 2007/0239942 A1 | 10/2007 | Rajwar et al. |
| 2007/0245309 A1 | 10/2007 | Gray et al. |
| 2007/0300238 A1 | 12/2007 | Kontothanassis et al. |
| 2008/0005504 A1 | 1/2008 | Barnes et al. |
| 2008/0040551 A1 | 2/2008 | Gray et al. |
| 2008/0065864 A1 * | 3/2008 | Akkary et al. ................ 712/225 |
| 2008/0098177 A1 | 4/2008 | Guthrie et al. |
| 2008/0098394 A1 * | 4/2008 | Shen ........................... 718/101 |
| 2008/0126647 A1 | 5/2008 | Cometto et al. |
| 2008/0209133 A1 | 8/2008 | Ozer et al. |
| 2008/0229070 A1 | 9/2008 | Charra et al. |
| 2008/0276304 A1 | 11/2008 | Maffione et al. |
| 2008/0288819 A1 * | 11/2008 | Heller, Jr. ..................... 714/19 |
| 2008/0307169 A1 | 12/2008 | Averill et al. |
| 2008/0320254 A1 | 12/2008 | Wingard et al. |
| 2008/0320268 A1 | 12/2008 | Wingard et al. |
| 2009/0113443 A1 | 4/2009 | Heller, Jr. et al. |
| 2009/0158006 A1 | 6/2009 | Nam |
| 2009/0172292 A1 | 7/2009 | Saha et al. |
| 2009/0198912 A1 | 8/2009 | Arimilli et al. |
| 2010/0122073 A1 | 5/2010 | Narayanaswamy et al. |
| 2010/0153953 A1 | 6/2010 | Adl-Tabatabai et al. |
| 2010/0169581 A1 | 7/2010 | Sheaffer et al. |
| 2010/0332716 A1 | 12/2010 | Sheaffer et al. |
| 2011/0145516 A1 | 6/2011 | Adl-Tabatabai et al. |
| 2011/0302446 A1 | 12/2011 | Becker-Szendy et al. |

FOREIGN PATENT DOCUMENTS

| | | |
|---|---|---|
| JP | 2007531167 A | 11/2007 |
| JP | 2008525921 A | 7/2008 |
| KR | 20040049255 A | 6/2004 |
| TW | 1476595 B | 3/2015 |
| WO | 2005066743 A2 | 7/2005 |
| WO | 2005066743 A3 | 12/2005 |
| WO | 2007002550 A2 | 1/2007 |
| WO | 2007115003 A1 | 10/2007 |
| WO | 2010/077872 A2 | 7/2010 |
| WO | 2010077842 A2 | 7/2010 |
| WO | 2010077850 A2 | 7/2010 |
| WO | 2010077884 A2 | 7/2010 |
| WO | 2010077885 A2 | 7/2010 |

OTHER PUBLICATIONS

International Search Report and Written Opinion received for PCT Application No. PCT/US2009/068081, dated Jul. 27, 2010, 9 pages.

International Preliminary Report on Patentability received for PCT Application No. PCT/US2009/068081, dated Jul. 14, 2011, 6 pages.

Office Action from counterpart Japanese Patent Application No. 2014-003360 dated Jul. 7, 2015, Japan Patent Office.

Notice of Reexamination from counterpart Chinese Patent Application for Invention No. 200910261800.8 dated Aug. 17, 2015, Patent Reexamination Board of State Intellectual Property Office, P.R. China.

Fourth Office Action from counterpart Chinese Patent Application No. 200910113666.7.4 dated Sep. 4, 2014, 8 pages.

Ananian C.S., et al., "Unbounded Transactional Memory," IEEE, HPCA-11, Feb. 2005, pp. 316-327.

Decision of Refusal from foreign counterpart Japanese Patent Application No. 2011-536630 dated Sep. 10, 2013, 4 pages.

Decision to Grant a Patent from foreign counterpart Japanese Patent Application No. 2011-536630 dated Oct. 14, 2014, 6 pages.

Decision to Grant a Patent from foreign counterpart Japanese Patent Application No. 2014-003360 dated Apr. 21, 2016, 6 pages.

Decision to Grant a Patent from foreign counterpart Korean Patent Application No. 10-2011-7007724 dated Apr. 23, 2013, 2 pages.

Second Office Action and Search Report from foreign counterpart China Patent Application No. 200911000212.5 dated Apr. 2, 2013, 32 pages.

Final Office Action from U.S. Appl. No. 12/346,500, dated Nov. 18, 2013, 6 pages.

Final Office Action from U.S. Appl. No. 12/346,500, dated Nov. 23, 2012, 14 pages.

Final Office Action from U.S. Appl. No. 12/346,543, dated Jan. 20, 2012, 16 pages.

Final Office Action from U.S. Appl. No. 13/355,302, dated Aug. 29, 2012, 8 pages.

Final Office Action from U.S. Appl. No. 13/359,238, dated Oct. 18, 2012, 8 pages.

First Office Action from foreign counterpart China Patent Application No. 200910113666.7, dated May 25, 2011, 9 pages.

First Office Action from foreign counterpart China Patent Application No. 200910261800.8, dated Jun. 6, 2012, 10 pages.

First Office Action from foreign counterpart China Patent Application No. 200911000212.5 dated May 10, 2012, 6 pages.

7irst Office Action from foreign counterpart Chinese Patent Application No. 200910216935.2 dated May 14, 2012, 11 pages.

Herlihy., et al., "Software Transactional Memory for Dynamic-Sized Data Structures," PODC '03, Sun Microsystems, Inc., Boston, Massachusetts, 2003, pp. 92-101.

Herlihy M., et al., "Transactional Memory: Architectural Support for Lock-Free Data Structures," Proceeding ISCA 93 Proceedings

(56) References Cited

OTHER PUBLICATIONS of the 20th Annual International Symposium on Computer Architecture, May 1993, vol. 21 (2), pp. 289-300.
IEEE, "IEEE 100: The Authoritative Dictionary of IEEE Standards Terms," Dec. 2000, IEEE, pp. 1255.
International Preliminary Report on Patentability for Application No. PCT/US2009/067983 dated Jul. 14, 2011, 6 pages.
International Preliminary Report on Patentability for Application No. PCT/US2009/068004 dated Jul. 14, 2011, 6 pages.
International Preliminary Report on Patentability for Application No. PCT/US2009/068114 dated Jul. 14, 2011, 6 pages.
International Preliminary Report on Patentability for Application No. PCT/US2009/068121 dated Jul. 14, 2011, 6 pages.
International Search Report and Written Opinion for Application No. PCT/US2009/067983 dated Jul. 27, 2010, 9 pages.
International Search Report and Written Opinion for Application No. PCT/US2009/068004 dated Jun. 22, 2010, 12 pages.
International Search Report and Written Opinion for Application No. PCT/US2009/068114 dated Aug. 9, 2010, 9 pages.
International Search Report and Written Opinion for Application No. PCT/US2009/068121 dated Jul. 29, 2010, 9 pages.
Jacob B., et al., "Memory Systems: Cache, DRAM, Disk," Morgan Kaufmann, Sep. 2007, pp. 92-97.
Kumar S., et al., "Hybrid Transactional Memory," Proceedings of the eleventh ACM SIGPLAN symposium on Principles and practice of parallel programming, Mar. 2006, pp. 209-220.
Moir, M. et al., "The Adaptive Transactional Memory Test Platform: A Tool for Experimenting with Transactional Code for Rock," In: The third annual ACM SIGPLAN Workshop on Transactional Computing, Feb. 2008, http:jlresearch.sun.com/sealable/pubs/TRANSACT2008-ATMTP.pdf.
Moss J.E.B., et al., "Nested Transactional Memory: Model and Preliminary Architecture Sketches," ACM, SCOOL '05, Oct. 2005.
Non-Final Office Action from U.S. Appl. No. 12/346,500, dated Dec. 14, 2011, 20 pages.
Non-Final Office Action from U.S. Appl. No. 12/346,500, dated Jul. 3, 2012, 14 pages.
Non-Final Office Action from U.S. Appl. No. 12/346,500, dated Jul. 19, 2013, 17 pages.
Non-Final Office Action from U.S. Appl. No. 12/346,530, dated Jun. 22, 2011, 10 pages.
Non-Final Office Action from U.S. Appl. No. 12/346,539, dated Jun. 22, 2011, 10 pages.
Non-Final Office Action from U.S. Appl. No. 12/346,543, dated Aug. 4, 2011, 14 pages.
Non-Final Office Action from U.S. Appl. No. 12/346,543, dated Aug. 20, 2012, 13 pages.
Non-Final Office Action from U.S. Appl. No. 12/346,543, dated Oct. 3, 2013, 16 pages.
Non-Final Office Action from U.S. Appl. No. 13/355,302, dated Jul. 19, 2013, 7 pages.
Non-Final Office Action from U.S. Appl. No. 13/355,302, dated Mar. 27, 2012, 8 pages.
Non-Final Office Action from U.S. Appl. No. 13/359,238, dated Apr. 16, 2012, 10 pages.
Non-Final Office Action from U.S. Appl. No. 13/359,238, dated Apr. 16, 2013, 10 pages.
Non-Final Office Action from U.S. Appl. No. 13/359,238, dated Oct. 37, 2013, 16 pages.
Notice of Allowance from U.S. Appl. No. 12/346,500, dated Mar. 28, 2014, 5 pages.
Notice of Allowance from U.S. Appl. No. 12/346,530, dated Aug. 29, 2013, 13 pages.
Notice of Allowance from U.S. Appl. No. 12/346,530, dated Dec. 30, 2011, 13 pages.
Notice of Allowance from U.S. Appl. No. 12/346,530, dated Jun. 28, 2012, 10 pages.
Notice of Allowance from U.S. Appl. No. 12/346,539, dated Aug. 29, 2013, 11 pages.
Notice of Allowance from U.S. Appl. No. 12/346,539, dated Dec. 5, 2011, 14 pages.
Notice of Allowance from U.S. Appl. No. 12/346,539, dated May 18, 2012, 10 pages.
Notice of Allowance from U.S. Appl. No. 12/346,543, dated Apr. 3, 2014, 13 pages.
Notice of Allowance from U.S. Appl. No. 12/346,543, dated Feb. 1, 2013, 10 pages.
Notice of Allowance from U.S. Appl. No. 13/355,302, dated Nov. 13, 2013, 8 pages.
Notice of Allowance from U.S. Appl. No. 13/359,238, dated Apr. 17, 2013, 6 pages.
Notice of Allowance from U.S. Appl. No. 13/359,238, dated Feb. 27, 2014, 6 pages.
Notice of Reasons for Rejection from foreign counterpart Japanese Patent Application No. 2011-543575, dated Feb. 26, 2013, 4 pages.
Notification of Reason for Refusal from foreign counterpart Korean Patent Application No. 10-2011-7007724, dated Jul. 20, 2012, 6 pages.
Notification of Reasons for Refusal from foreign counterpart Japanese Patent Application No. 2011-536630, Feb. 4, 2014, 4 pages.
Notification of Reasons for Refusal from foreign counterpart Japanese Patent Application No. 2011-536630 dated Jan. 15, 2013, 6 pages.
Office Action from foreign counterpart China Patent Application No. 200911000282.0, dated May 25, 2012, 7 pages.
Restriction Requirement from U.S. Appl. No. 12/346,500, dated Aug. 31, 2011, 6 pages.
Restriction Requirement from U.S. Appl. No. 12/346,530, dated Apr. 1, 2011, 8 pages.
Restriction Requirement from U.S. Appl. No. 12/346,539, dated Apr. 1, 2011, 7 pages.
Second Office Action from foreign counterpart China Patent Application No. 200910261800.8, dated Feb. 27, 2013, 8 pages.
Second Office Action from foreign counterpart Chinese Patent Application No. 200910216935.2, dated Mar. 13, 2013, 14 pages.
Third Office Action and Search Report from foreign counterpart China Patent Application No. 200911000212.5, dated Nov. 4, 2013, 12 pages.
Office Action and Search report from foreign counterpart Taiwan Patent Application No. 098143374, dated Jan. 14, 2014, 21 pages.

* cited by examiner

REGISTERING A USER-HANDLER IN HARDWARE FOR TRANSACTIONAL MEMORY EVENT HANDLING

FIELD

This invention relates to the field of processor execution and, in particular, to execution of groups of instructions.

CROSS REFERENCE TO RELATED APPLICATIONS

This application is related to the following patent applications filed herewith: U.S. patent application Ser. No. 12/346,543, entitled "Extending Cache Coherency Protocols to Support Locally Buffered Data," by Gad Sheaffer et al., filed on Dec. 30, 2008, issued as U.S. Pat. No. 8,799,582; U.S. patent application Ser. No. 12/346,539, entitled "Memory Model for Hardware Attributes Within a Transactional Memory System," by Gad Sheaffer et al., filed on Dec. 30, 2008, issued as U.S. Pat. No. 8,627,014; U.S. patent application Ser. No. 12/346,530, entitled "Read and Write Monitoring Attributes in Transactional Memory (TM) Systems," by Gad Sheaffer et al., filed on Dec. 30, 2008, issued as U.S. Pat. No. 8,627,017; U.S. patent application Ser. No. 12/346,500, entitled "Metaphysical Address Space for Holding Lossy Meta-data in Hardware," by Gad Sheaffer et al., filed on Dec. 30, 2008, issued as U.S. Pat. No. 8,806,101.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously has created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions. In the example above, both threads execute within the hash table, and their memory accesses are monitored/tracked. If both threads access/alter the same entry, conflict resolution may be performed to ensure data validity. One type of transactional execution includes Software Transactional Memory (STM), where tracking of memory accesses, conflict resolution, abort tasks, and other transactional tasks are performed in software, often without the support of hardware. Another type of transactional execution includes a Hardware Transactional Memory (HTM) System, where hardware is included to support access tracking, conflict resolution, and other transactional tasks.

Some operations inside a transaction are based on data read or produced by the transaction. If this data or information monitoring accesses to this data is compromised, an unexpected side effect may occur. For example, assume a transaction wrote a branch destination to some variable X. Due to the semantics of transactional memory, the value of X may be changed (e.g. X was written in a buffered way and the buffer was lost). After a change, the transaction attempts to branch based on the now invalid value read from address X, and as consequence, an unexpected result occurs. Events, such as those described above, handled by purely synchronous software (OS or VMM) methods, such as polling, or at the end of the transaction may not be immediate enough to handle changes or conflicts before unexpected result occurs.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware structures for transactional execution, specific types and implementations of access monitors, specific cache implementations, specific types cache coherency models, specific data granularities, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific and alternative multi-core and multi-threaded processor architectures, specific compiler methods/implementations, and specific operational details of microprocessors, have not been described in detail in order to avoid unnecessarily obscuring the present invention.

The method and apparatus described herein are for registering a handler in hardware to support optimized control flow transfer to a handler. Specifically, registering a handler is primarily discussed in reference to a hardware transactional memory system. However, the methods and apparatus for registering a handler is not so limited, as they may be implemented for any hardware execution requiring intervention of a handler.

Figure 1:
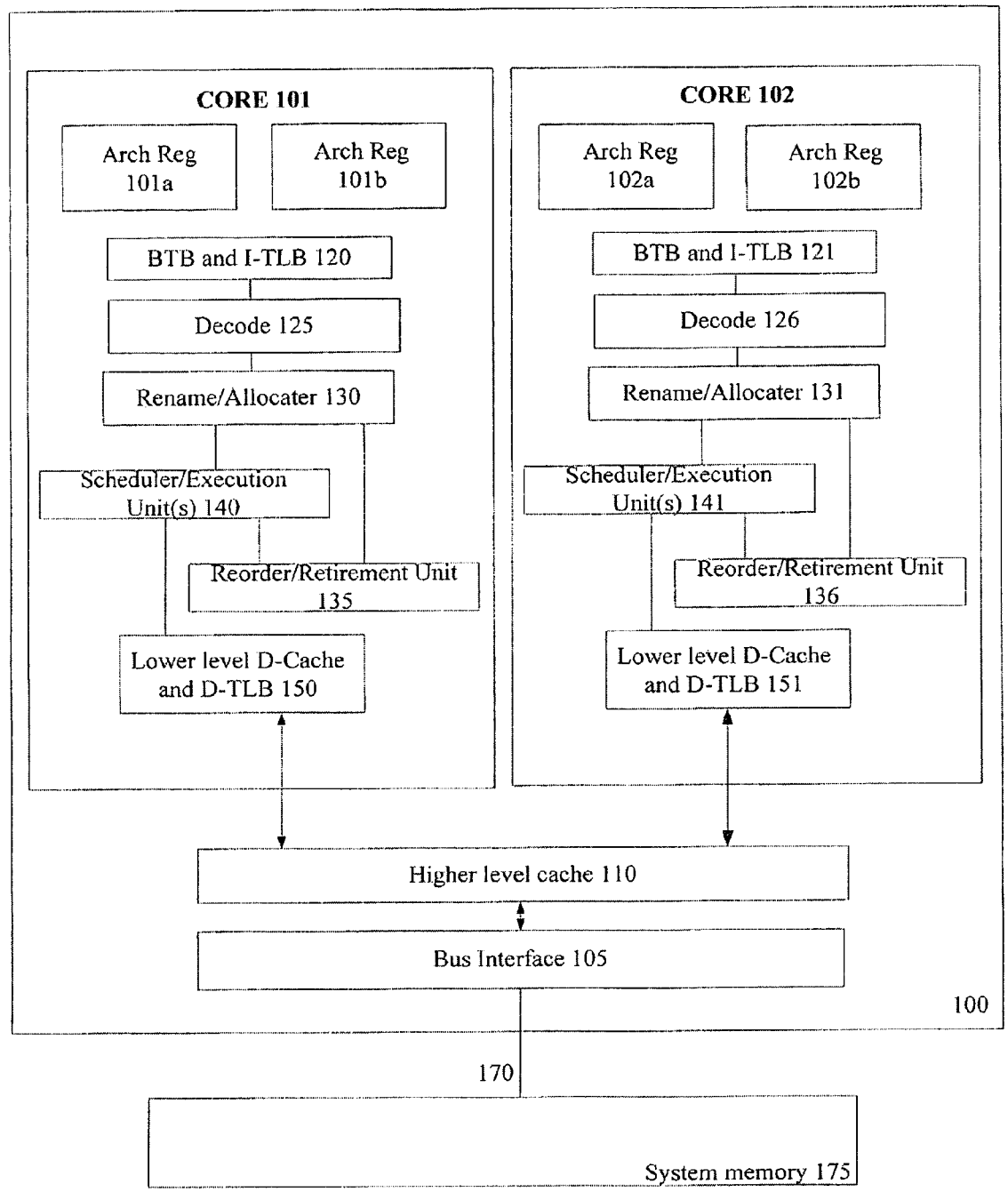
FIG. 1 illustrates an embodiment of a processor including multiple processing elements capable of executing multiple software threads concurrently.

Referring to FIG. 1, an embodiment of a processor capable of executing multiple threads concurrently is illustrated. Note, processor 100 may include hardware support for hardware transactional execution. Either in conjunction with hardware transactional execution, or separately, processor 100 may also provide hardware support for hardware acceleration of a Software Transactional Memory (STM), separate execution of a STM, or a combination thereof, such as a hybrid Transactional Memory (TM) system. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102, which share access to higher level cache 110. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as reorder buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative functional units/resources of a processor is illustrated. Note that a processor may include, or omit, any of these functional units, as well as include any other known functional units, logic, or firmware not depicted.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further-out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e. a type of instruction cache, may instead be coupled after decoder 125 to store recently decoded traces. Module 120 also potentially includes a branch target buffer to predict branches to be executed/taken and an instruction-translation buffer (I-TLB) to store address translation entries for instructions.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 110a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 100 is capable of hardware transactional execution, software transactional execution, or a combination or hybrid thereof. A transaction, which may also be referred to as a critical or atomic section of code, includes a grouping of instructions, operations, or micro-operations to be executed as an atomic group. For example, instructions or operations may be used to demarcate a transaction or a critical section. In one embodiment, described in more detail below, these instructions are part of a set of instructions, such as an Instruction Set Architecture (ISA), which are recognizable by hardware of processor 100, such as decoders described above. Often, these instructions, once compiled from a high-level language to hardware recognizable assembly langue include operation codes (op-codes), or other portions of the instructions, that decoders recognize during a decode stage.

Typically, during execution of a transaction, updates to memory are not made globally visible until the transaction is committed. As an example, a transactional write to a location is potentially visible to a local thread, yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible.

However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending.

A Software Transactional Memory (STM) system often refers to performing access tracking, conflict resolution, or other transactional memory tasks in or at least partially in software. In one embodiment, processor 100 is capable of executing a compiler to compile program code to support transactional execution. Here, the compiler may insert operations, calls, functions, and other code to enable execution of transactions.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase.

Nevertheless, despite the execution environment and dynamic or static nature of a compiler, the compiler, in one embodiment, compiles program code to enable transactional execution. Therefore, reference to execution of program code, in one embodiment, refers to (1) execution of a compiler program(s), either dynamically or statically, to compile main program code, to maintain transactional structures, or to perform other transaction related operations, (2) execution of main program code including transactional operations/calls, (3) execution of other program code, such as libraries, associated with the main program code, or (4) a combination thereof.

In one embodiment, processor 100 is capable of executing transactions utilizing hardware/logic, i.e. within a Hardware Transactional Memory (HTM) system. Numerous specific implementation details exist both from an architectural and microarchitectural perspective when implementing an HTM; most of which are not discussed herein to avoid unnecessarily obscuring the invention. However, some structures and implementations are disclosed for illustrative purposes. Yet, it should be noted that these structures and implementations are not required and may be augmented and/or replaced with other structures having different implementation details.

As an example of an implementation design choice, an HTM may operate in an update-in-place manner or a write-buffering manner. In an update-in place HTM, transactional writes are performed to referenced memory addresses to modify previous data held therein. However, this modified data is not provided to external requesting threads, i.e. the data is not made globally visible, but is provided to local reads for local memory ordering purposes. Additionally, the previous data is often "logged," such that upon an abort of the transaction, the previous data is capable of being restored to achieve the state of the thread before execution of the transaction begun.

To illustrate, assume data cache 150 includes a first level data cache to hold data from higher level memory, such as cache 110 and system memory 175. Therefore, upon encountering a transactional write to data cache 150, the previous data item, in one embodiment of a write-back cache, writes the previous data item back to higher level cache 110. Alternatively, the previous data may be logged in another separate memory within processor 100 or external thereto. After logging the previous data item, the transactional write is performed to update the data item in cache 150. Therefore, a local thread, such as local thread 101*a*, i.e. a thread that is associated with the transactional write, may read from the modified data item in cache 150. However, another thread, such as thread 102*b*, is not provided the modified data, but rather the logged data, in response to a read request, if the transaction including the transactional write has not yet committed. When the transaction commits, the logged data is invalidated or disregarded. Yet, if the transaction aborts, the previous data is reloaded or globally identified as the valid data.

In contrast, in a write-buffering HTM, transactional writes are buffered in a write buffer, while previous data resides in its original location. If a local thread, such as thread 102b, performs a read of the data transactionally written, then the modified data is forwarded from the write buffer. As a corollary, if an external thread requests a read of the data while the transaction including the transactional write is still pending, the previous data from the original location is provided. Furthermore, upon a commit of the transaction, the modified data is copied to the corresponding memory address, while upon an abort, the buffered data is disregarded.

As can be seen from the discussion above, accesses and requests may be made to data items both by local processing elements, as well as potentially by other processing elements. Without safety mechanisms, some of these accesses would potentially result in invalid data and execution, i.e. a write to data invalidating a read, or a read of invalid data. As a result, processor 100 potentially includes logic to track or monitor memory accesses to and from data items for identification of potential conflicts.

A data item or data element may include data at any granularity level, as defined by hardware, software or a combination thereof. A non-exhaustive list of examples of data, data elements, data items, or references thereto, include a memory address, a data object, a class, a field of a type of dynamic language code, a type of dynamic language code, a variable, an operand, a data structure, and an indirect reference to a memory address. However, any known grouping of data may be referred to as a data element or data item. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to the field x of object a of class A. For example, an expression may be couched as a.x=a.y+a.z. Here, field y and field z are loaded to be added and the result is to be written to field x.

Therefore, monitoring memory accesses to data items may be performed at any of data level granularity. For example, in one embodiment, memory accesses to data are monitored at a type level. Here, a transactional write to a field A::x and a non-transactional load of field A::y may be monitored as accesses to the same data item, i.e. type A. In another embodiment, memory access monitoring is performed at a field level granularity. Here, a transactional write to A::x and a non-transactional load of A::y are not monitored as accesses to the same data item, as they are references to separate fields. Note, other data structures or programming techniques may be taken into account in tracking memory accesses to data items. As an example, assume that fields x and y of object of class A, i.e. A::x and A::y, point to objects of class B, are initialized to newly allocated objects, and are never written to after initialization.

In one embodiment, a transactional write to a field B::z of an object pointed to by A::x are not monitored as memory access to the same data item in regards to a non-transactional load of field B::z of an object pointed to by A::y. Extrapolating from these examples, it is possible to determine that monitors may perform monitoring at any data granularity level.

In one embodiment, monitors include read monitors and write monitors to track loads and stores, which are determined to be monitored, accordingly. As an example, hardware read monitors and write monitors are to monitor data items at least at a granularity of the data items despite the granularity of storage structures to hold the data items. An example of utilizing read monitors/attributes to monitor data items is discussed in more detail in application Ser. No. 12/346,530, entitled "Read and Write Monitoring Attributes in Transactional Memory (TM) Systems," by Gad Sheaffer et al., filed Dec. 30, 2008, issued as U.S. Pat. No. 8,627,017. However, monitors, attributes, annotations, or other tracking mechanisms may be utilized to detect conflicts associated with transactional execution utilizing any granularity of data or structures to hold the data.

Read or write attributes include any logic, firmware, or structure for holding states associated with data items. For example, attributes for a data item include a bit vector, where each bit in the bit vector represents an attribute of a data item, such as transactionally loaded, transactionally written, non-transactionally loaded, non-transactionally written, not transactionally loaded, not transactionally written, not non-transactionally loaded, not non-transactionally written, access conflict detected, no access conflict detected, a read request, no read request, a write request, no write request, an ownership request, no ownership request, or any other attribute or state associated with a data item or memory location to hold the data item.

As another example, the attributes for a data item includes an encoded value. For example, states, such as the four states: (1) transactionally written; (2) transactionally read; (3) not transactionally written; and (4) not transactionally read, are encoded utilizing two attribute bits, i.e. four binary values of 00, 01, 11, and 10.

As yet another example, attributes are included as part of a coherency state array associated with a cache memory, such as data cache 150. A non-exhaustive list of exemplary cache coherency states include: (1) a modified (M 420) state, i.e. the address was written and has no attribute associated with it; (2) a modified read (MR 430) state, i.e. the address was written and has the read attribute associated with it (e.g when a previous read to the address and then the transaction writes an address); (3) a modified write (MW 425) state, i.e. the address was written and has the write attribute associated with it; (4) a modified read write (MRW 435) state, i.e. the address was written and has both Read and Write attributes associated with it; (5) an exclusive (E 440) state, i.e. the address was read and has no attribute associated with it; (6) an exclusive read (ER 445) state, i.e. the address was read and has the read attribute associated with it; (7) a shared (S 410), i.e. the address was read and has no attribute associated with it; (8) a shared read (SR 415) state, i.e. the address was read and has the Read attribute associated with it.

Here, additional cache coherency states, such as monitored coherency states may be added to traditional Modified Exclusive Shared and Invalid (MESI) cache coherency states. As a result, existing known coherency and communication/snoop protocols may be utilized in combination with hardware monitors/attributes to detect conflicts.

Based on the design, different combinations of cache coherency requests and monitored coherency states of cache lines result in potential conflicts, such as a cache line holding a data item being in a shared read state and a snoop indicating a write request to the data item. Inversely, a cache line holding a data item being in a modified write state and a snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting.

In one embodiment, attributes associated with data items held in cache 150 are implemented utilizing ephemeral or private stores. Here, attributes may be held anywhere in cache 150, such as in lines of cache 150 themselves. For example, one example of an HTM described above, includes an update-in-place HTM. Here, transactional modified data is held in current memory locations, while the previous data is logged/backed up, such as in a higher-level memory. As a result, in one embodiment, when cache 150 is accessed with regard to a data item, the attributes are ephemerally stored with the data item in cache 150. Here, the data item is held in a private or ephemeral coherency state, which allows cache control logic to ensure transactional semantics are upheld. In other words, a data item held in an ephemeral state is not provided to other threads.

However, if the data item is evicted from cache 150, then the privately held attributes are potentially lost. Essentially, the attributes are system created to monitor the data item, and are not written back to higher level memory. In a scenario where attributes are to decay, i.e. lost upon an eviction or other event, a potential conflict may be triggered in a similar manner to detecting a potential access conflict, as described above. A version of ephemeral stores and private states, such as buffered stores and a buffered state, is discussed in a related application filed herewith entitled, "Extending the MESI protocol to support locally buffered data."

In one embodiment, a handler is registered in hardware to support efficient handling of conflicts, such as access conflict, loss of monitor conflicts, loss of data conflicts, etc. As an example, a software writeable register is provided for software, such as transactional runtime or application code, to register an address of a transaction handler. When an event of interest, such as the conflicts or loss of information described above, is detected, then in one embodiment, the control flow is vectored to the transactional handler registered in the software writeable register without intervention of privileged software, such as an Operating System (OS).

In one embodiment, events of interest, i.e. handler events to cause invocation of the transactional handler, are capable of being specified by non-privileged software, such as a transactional runtime or application code. Events of interest in different embodiments may be synchronous, asynchronous, or a combination thereof. As a consequence, the ability to transfer control to a software handler for both synchronous and asynchronous events without intervention of an OS is provided, which potentially eliminates the delay involved with waiting for privileged level software dispatch process to start execution of a handler. Therefore, handler events that require low latency reaction before resulting in unexpected execution and results are efficiently and quickly handled.

As state above in the initial reference to FIG. 1, the architecture of processor 100 is purely illustrative for purpose of discussion. Similarly, the specific examples of associating attributes with data items/elements is also exemplary, as any method of associating hardware monitors/attributes at different granularity data items may be utilized.

Figure 2:
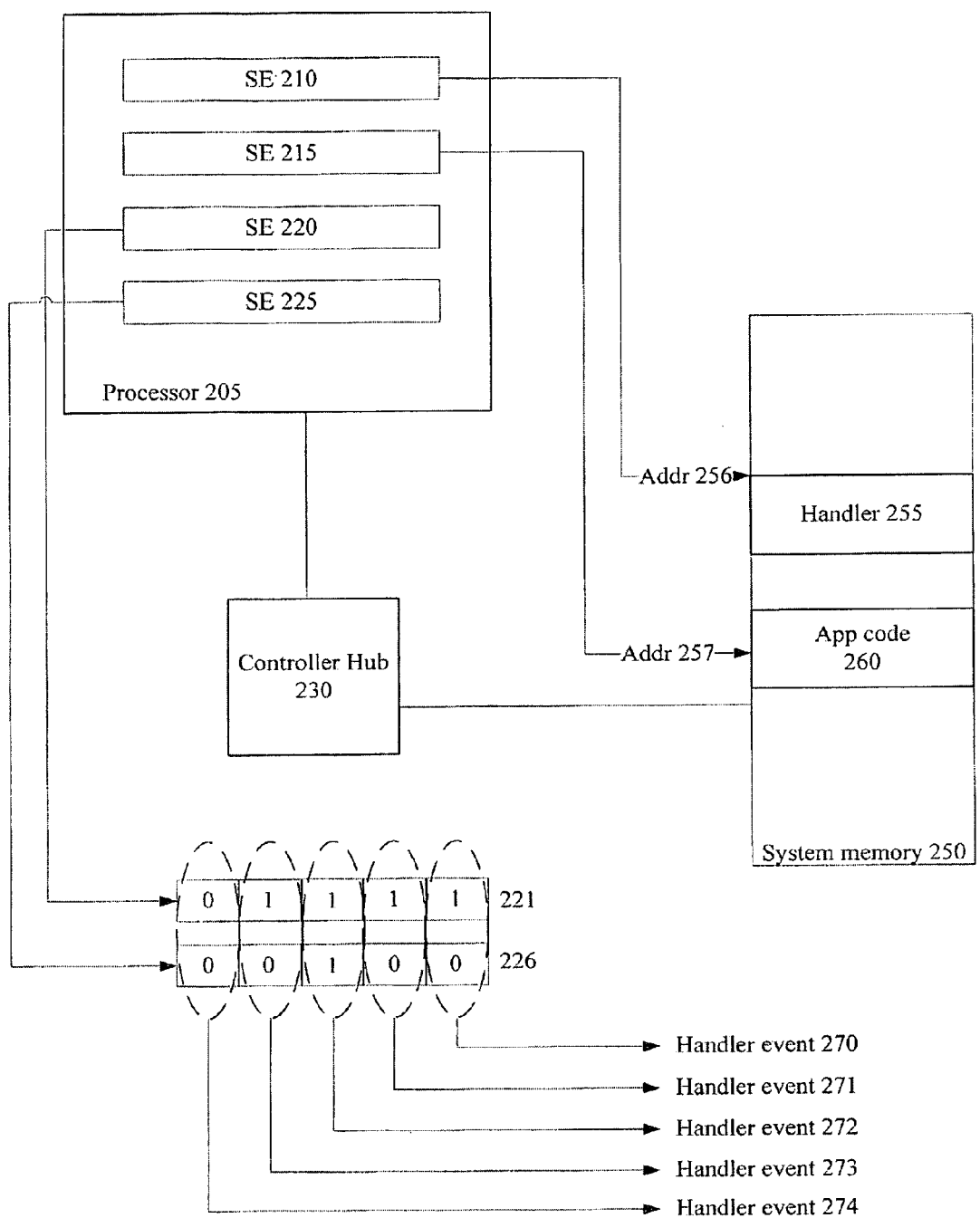
FIG. 2 illustrates an embodiment of structures in a processor to support control transfer to a handler in response to a handler event.

Referring to FIG. 2, an embodiment of a system including a processor to provide support for registering a handler in hardware is depicted. Processor 205 may include or omit any of the functional units or modules described in reference to FIG. 1, as well as include any other known units or logic of a processor. Furthermore, a collection of storage elements is also depicted. Yet, the operations and methods described below in relation to the separate storage elements may be combined within any number of storage elements.

As illustrated, processor 205 is coupled to system memory 250 though controller hub 230. System memory 250 includes any memory device, such as a Random Access Memory (RAM). Here, system memory 250 holds application code 260, which may include one or more transactions to be executed on processor 205, and handler 255, which as described below, may be registered in hardware of processor 205 to handle transactional related handler events that occur during execution of application code 260.

In one embodiment, controller hub 230 includes a chipset, which is often comprised of two hubs, i.e. a memory controller hub to communicate with system memory 250 and to potentially interface with an input/output (I/O) device such as a graphics processor and an I/O controller hub to communicate with other I/O devices, such as a network interface controller (NIC), an audio device or other known I/O device.

Processor 205 includes storage element 210. A storage element refers to any logic, component or device to hold information or elements, such as binary values, data, code, instructions, addresses, or other known computer related information. As a common example, a storage element includes a register. Typical registers found in processors include general purpose registers, data registers, address registers, conditional registers, floating-point registers, constant registers, vector registers, special purpose registers, program counter (a.k.a. instruction pointer) registers, status registers, instruction registers, machine/model-specific registers (MSRs), control registers, and general user-accessible registers. As a result, each of storage elements 210-225 may individually be any one of the aforementioned registers in different embodiments.

In one embodiment a handler, such as handler 255, is to be registered in storage element 210. Registering handler 255 with hardware of processor 205 includes any identification of handler 255, or a location thereof, to processor 205. As an example, registering handler 255 in storage element 210 includes storing a reference to handler 255 in storage element 210. In other words, once registered, storage element 210 holds a reference to handler 255.

Any method of registering a reference to code may be utilized to update storage element 210 to hold a reference to handler 255. In one embodiment, non-privileged software/code is to register handler 255 in storage element 210. Non-privileged software may include any code that is not privileged, such as software not allowed to execute at a specific high-privilege level, i.e. a privilege level zero. However, non-privileged software, in one embodiment, includes user-level code. In other words, transactional runtime code, application code, or virtual machine code is able to register handler 255 in hardware of processor 205 before execution of transactions. Therefore, storage element 210, in one embodiment, is modifiable by user-level or non-privileged level code to be updated to hold the reference to handler 255.

For example, application code, before executing a transaction, registers handler 255 in storage element 210, such that if a handler event occurs during execution of the transaction, user-registered handler 255 is invoked to handle the event. Consequently, in this embodiment, a user is both able to define the handler to be utilized in case of a transactional handler event and register it in hardware to provide optimized control flow transfer to the handler. However, a handler, in other embodiments, may be registered by privileged-level software, such as an OS.

In one embodiment, a reference to handler 255 includes a reference to starting address 256 of handler 255 held in system memory 250. As there are numerous addressing methods utilized in processors, a reference to a memory address potentially includes any known computer reference to an address. As one example, a virtual address and an offset is utilized as a reference to starting address 256 of handler 255. Here, page tables and translation tables held in storage of processor 205 translate a virtual address to a reference base physical address and add the offset thereto to obtain a physical address, i.e. physical address 256 referencing handler 255. Note that omission of an offset, or a value of a code segment, may limit usage of the handler to a current code segment, which potentially also limits legal instructions within a transaction being executed. Another example of a reference includes a direct physical address held in storage element 210 to reference handler 255 directly.

In one embodiment, storage element 220 is to specify/indicate a plurality of handler events. As stated above, the handler events may include asynchronous handler events, synchronous handler events, or a combination thereof. A synchronous handler event includes an event which is connected/associated with an instruction, such as execution of an illegal instruction/operation or an access to an invalid location. In contrast, an asynchronous event is often referred to as an event not directly related to control flow of a program or an instruction. Examples of handler events include a lack of attribute information, a loss of attribute information, an execution of an instruction that is illegal within a transaction's scope, an illegal control transfer, an access to a non-checkpointed register, a loss of buffered data, an access to a memory type forbidden in the scope of a transaction, an exception, a system call, and a loss of monitored data. Here, a common example of a synchronous instruction is execution of an illegal instruction, such as an instruction to illegally transfer control to a protected domain, while a typical example of an asynchronous event includes loss of attribute information. However, a handler event may include any known event, either synchronous or asynchronous, that is to be handled by a software handler.

In one embodiment, storage element 220 is to hold a bit vector, such as bit vector 221. Each bit in bit vector 221 corresponds to a handler event, such as events 270-274. For example, events 270-274 represent any combination of the aforementioned events, as well as any other known handler events not described herein. When a bit is set, the corresponding handler event is enabled, and inversely, when a bit is unset the corresponding handler event is disabled.

As illustrated, the first bit of vector 221 to be held in storage element 220 is unset, i.e. set to a logical zero, so handler event 274 is disabled. Note that the logical values are illustrative and may be inverted, i.e. a logical zero is enabling and a logical one is disabling. Essentially, vector 221 operates as a mask. Here, event 274, such as an access to a non-checkpointed register, even if detected does not result in invocation of handler 255 due to it being disabled. In this scenario, such an access may be allowable due to the irrevocable or obstinate nature of the transaction, i.e. the transaction is given priority so it likely will not abort. However, if any of the other enabled events 270-273 are detected, then handler 255 is executed based on the reference held in storage element 210. Although a bit vector is utilized as an example, method of storing specified events, such as through use of encoded values or instructions may be also utilized.

In one embodiment, a portion or all of storage element 220 is modifiable by the non-privileged software. Here, the software may be able to both register handler 255 in storage element 210, as well as specify/register handler events to cause execution of handler 255. Yet, in one example, a portion of storage element 220 is reserved. As a consequence, hardware is able to define some reserved handler events that software is not capable of disabling, while other events are capable of being enabled by software.

Often, a handler receives some communication in regards to the circumstances of a detected handler event. Therefore, in one embodiment, storage element 225 includes a status storage element to hold a status value to indicate the handler event that is to be handled by handler 255, i.e. the detected handler event. Continuing the example from above, status storage element 225 may also hold a bit vector, such as bit vector 226. Here, instead of enabling or disabling handler events, a bit set to a first logical value is to indicate the handler event was detected, while a bit set to a second logical value is to indicate the handler event was not detected.

Although only one bit is illustrated as set to a logical one, multiple bits may be set to indicate multiple events occurred and are to be handled. In one embodiment, storage element 225 is readable by user-level or non-privileged software. As a result, application code 260 or handler 255 is able to read storage element 225 to determine handler events that occurred during execution, either for profiling purposes or for actual event handling purposes. Either through interconnection of storage element 220 to storage element 210 or a reference to storage element 210 held in processor 205, in response to detecting a handler event, execution is vectored from execution of application code at a current point, i.e. instruction at address 257, to execution of handler 255, i.e. address 256, based on the reference, i.e. a representation of address 256, held in storage element 210.

Vectoring of execution or transfer of a control flow from application code 260 to handler 255 may be done in any known manner of vectoring execution or directing a control flow of a program. As referred to above, previous systems often rely on controlling software, such as an OS, to transfer control to different programs, such as a handler. Here, events may be detected and collected, while the OS polls information to determine if events have occurred. Once the OS is aware of the occurrence of an event it schedules a time for execution of a handler. However, as illustrated in the background section example, unexpected execution results, such as branching based on an invalid target address, may occur if a transactional event, which may be either synchronous or asynchronous, is not handled in a more efficient manner, i.e. with less skid.

Skid is typically defined as the latency between an occurrence of a handler scenario, i.e. detection of handler events, and an actual invocation of a handler. For example, if handler 255 is invoked due to loss of buffered/privately held read data, and a skid value is three, then it may take up to three instructions from the loss of the buffered data until a handler is invoked. Although instruction count is utilized to refer to skid, any other processing metric, such as execution cycles, may also be utilized. As a result, control flow transfer to handler 255 is to potentially be performed with less skid.

Examples of control flow transfer include a fault-like manner, i.e. before an instruction that identifies the fault/event retires, which implies a skid level of zero, a trap-like manner, i.e. at a next interruptible window, which implies a skid level of one, or a combination thereof for different events. Sometimes skid is based on the type event. For example, some operations that potentially cause unexpected execution results are not to retire to ensure there is no unexpected result observed in the system, i.e. a skid level of zero. An example includes an illegal operation within a scope of a transaction that is to change a state not previously checkpointed. Here, if the change of state occurs, then the previous state is lost, and in response to a transaction abort, the previous state cannot be restored. As a result, before retirement of the operation, execution is vectored to the handler, which in this instance, may checkpoint the previous state and then allow the operation to be performed.

In one embodiment, optimized control flow transfer is performed utilizing hardware of processor 205 to transfer control to handler 255 without intervention of privileged level software. Examples of privileged level software include OS software, kernel code, and virtual machine monitor (VMM) code. Here, processor 205 may vector execution of application code 260 to handler 255 based on a reference registered in storage element 210. To illustrate, assume a reference is held in register 210, such as a virtual address and an offset associated with physical address 256 stored in register 210 by application code 260. Furthermore, handler events have been specified, such as by user-level code 260, in register 220 and an event of those handler events has been detected, which is indicated by the update to register 225 to hold a status value.

As a result, execution logic stores a reference to a current program counter, i.e. instruction pointer to current instruction address 257, in register 215. Similar to the reference held in register 210, the instruction pointer address may include a virtual address and offset or other reference to a current point immediately before execution is vectored, such as an address of a current or next instruction based on the instruction pointer implementation. Essentially, register 215 operates as a return register in a similar manner to register 210. In other words, the reference in register 210 is utilized to optimize control flow transfer to handler 255 and a reference held in return register 215 is utilized to optimize the return of the control flow from handler 255 to application code 260.

In this example, after the current point in program 260 is logged in register 215, then execution resources executing application code 260 are utilized to vector execution to application code 260 based on the reference held in register 210. Here, the reference to address 256 essentially becomes the new instruction pointer and execution at the start, i.e. a first instruction, of handler 255 is started. Execution resources include any of the execution logic described above in reference to FIG. 1, or any other known execution related logic. For example, operations of a transaction may be executing in application code 260, i.e. load or store operations scheduled for execution on a load/store execution unit. Next, in response to the handler event, a jump execution unit executes a jump-type operation to jump execution from instruction address 257 to address 256 without intervention of privileged level software. Here, the jump-type operation may include a normal jump operation or a far jump operation.

The address referenced in register 210, such as the virtual address and offset to be translated to address 256, is utilized as a target address for the jump-type operation to vector execution from application code 260 to handler 255. Within this framework, after handler 255 is done executing, i.e. finished handling the handler event, then a similar jump-type instruction/operation is performed to return to application code 260. However, this time instead of the reference held in register 210 as the target address, the previous instruction pointer reference held in return register 215 is utilized as the target address for the return jump to the previous point within application code 260.

Figure 3:
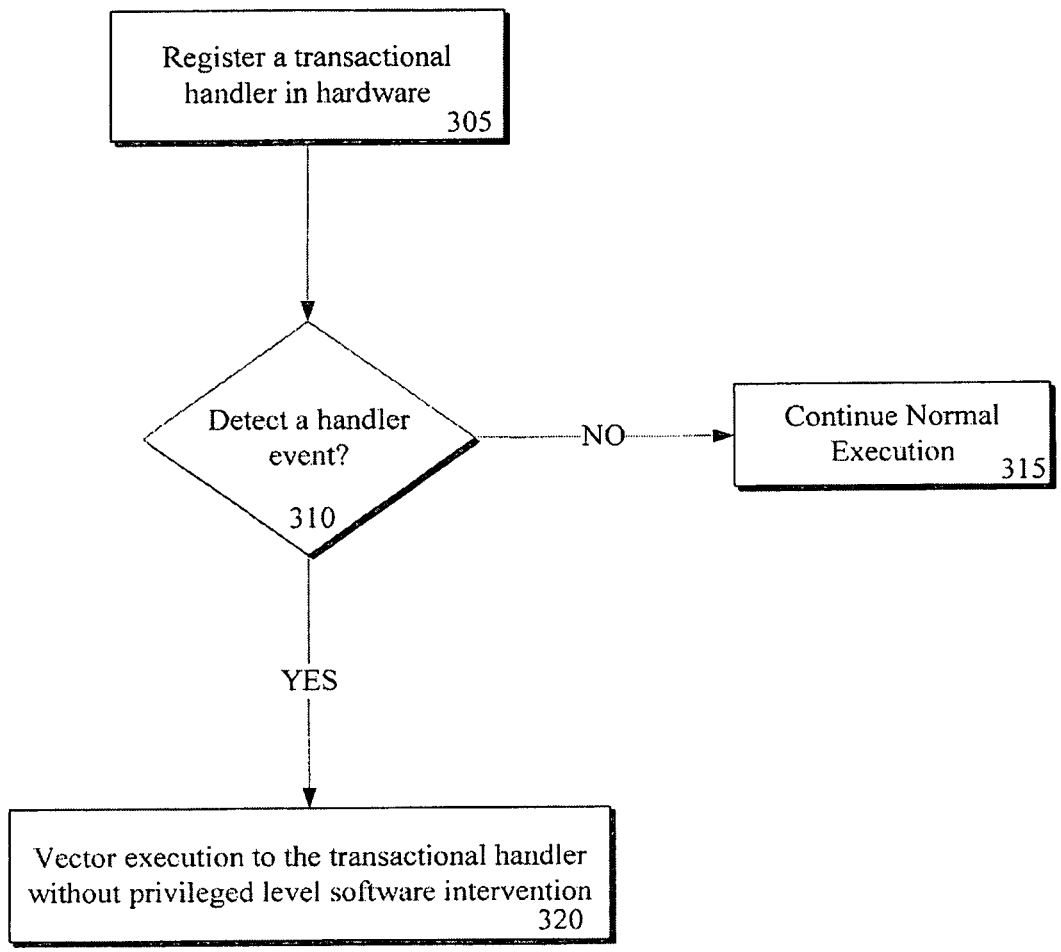
FIG. 3 illustrates an embodiment of a flow diagram for a method of vectoring execution to a transactional handler without privileged level software intervention.
Figure 4:
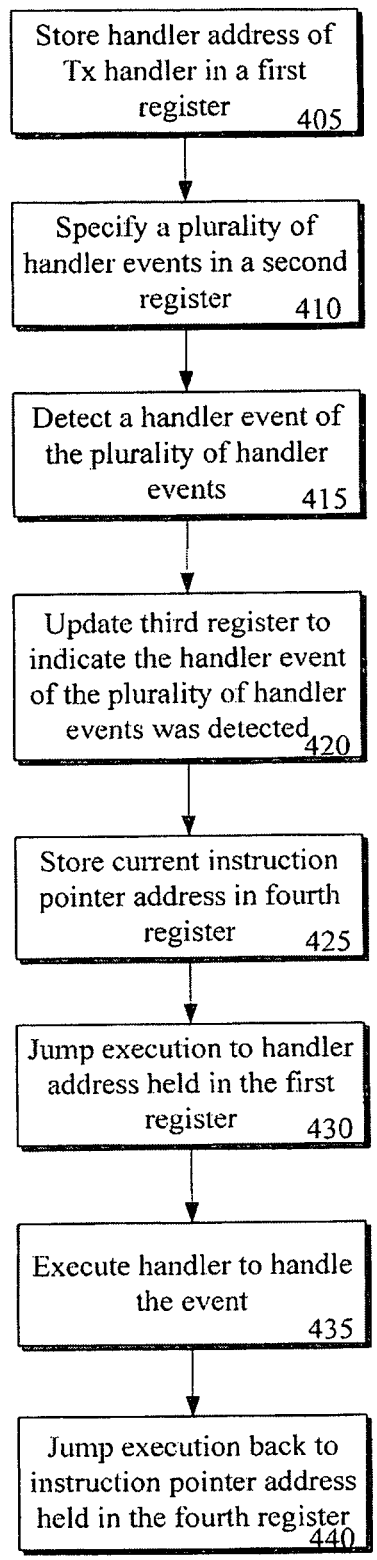
FIG. 4 illustrates another embodiment of a flow diagram for a method of transferring a control flow to a software handler utilizing hardware.

Reference above to handler 255 includes any known code for handling synchronous or asynchronous events. In fact, handler 255 may perform different operations depending on the detected handler event. For example, handler 255 may attempt to perform commit or abort functions when some handler events are encountered, and perform other operations, such as checkpointing a register or location, upon encountering other handler events. As a result, a user may specify handler events and define in hardware the handler to be utilized, so when a handler event is encountered, the hardware is able to transfer control to the handler specified by the user-level code without the delay of intervention of privileged software. Furthermore, hardware may be provided to communicate information regarding the handler event, such as the event, addresses associated with the event, and other event related information. FIGS. 3-4 discuss embodiments of vectoring control to a handler.

Turning to FIG. 3 an embodiment of a flow diagram for a method of vectoring execution to a transactional handler without privileged level software intervention is depicted. Note the flows in FIGS. 3 and 4 are illustrated in a substantially serial fashion. However, the depicted flows may be executed in a different order, in parallel with each other, or not at all in other embodiments. For example, in FIG. 4 a handler address is stored in a first register in flow 405 before handler events are specified in flow 410. Yet, the events may be specified before the handler address is stored in the first register without departing from the purpose of FIG. 4.

In flow 305 a transactional handler is registered in hardware of a processor. Any method of registering a handler in hardware may be utilized, such as adding a reference to the handler in a table or stack held in the processor. In one embodiment, a reference to an address associated with the transactional handler is placed in a register. The reference to the address includes any known address reference. As an example, the reference includes a virtual address and an offset capable of being translated by hardware structures in the processor, i.e. a translation buffer and/or page tables. As noted above, the register may be user-accessible, such that application code or transactional runtime code performs the registration either upon initialization of the code or within the body of a code, such as at a start of a transaction.

In flow 310 it is determined if a handler event is detected. Examples of handler events include a lack of attribute information, a loss of attribute information, an execution of an instruction that is illegal within a transaction's scope, an illegal control transfer, an access to a non-checkpointed register, a loss of buffered data, an access to a memory type forbidden in the scope of a transaction, an exception, a system call, and a loss of monitored data. As can be seen, a handler event, in this example, may include a synchronous and an asynchronous event. However, as described in more detail below, in one embodiment, instead of handling the event utilizing latency ridden software polling, both synchronous and asynchronous events may be handled in a quick asynchronous hardware fashion to provide optimized skid handling. Reference above to FIG. 2 illustrated an embodiment where user-level code or a combination of privileged code and user-level code specify handler events. However, handler events may also be specified by hardware, firmware, or other software If no event is detected, then in flow 315 execution continues as normal. However, if an event is detected in flow 310, then in flow 320 execution is vectored to the transactional handler without privileged level software intervention. Note that any method of directing execution to a handler without OS, kernel, or virtual machine monitor code being executed may be utilized. An example described below in reference to FIG. 4 includes vectoring execution based on values held in registers of a processor.

Referring to FIG. 4 an embodiment of a flow diagram for a method of transferring a control flow to a software handler utilizing hardware. In flow 405 a handler address of a transactional handler is stored/written to a first register. Here, user-level software writes a reference to an address, such as a virtual address and offset. In flow 410, the user-level software specifies a plurality of handler events in a second register. As an example described above, the user-level software sets/resets bits of a bit vector corresponding to hardware defined handler events. Note the handler events may be synchronous events, asynchronous events, or a combination thereof.

In flow 415 a handler event of the plurality of handler events is detected. Event detection may include a number of methods that may span multiple functional units. For example, to detect loss of attribute data or monitored data, cache control logic may detect an eviction of a monitored line and report it accordingly. However, for an illegal instruction, a decoder detecting an opcode associated with an illegal operation potentially detects and reports the event. As another example, an operation to update a state of a register is detected in a stage of a pipeline of the processor and logic associated with that stage detects the handler event. Other logic and methods of detecting hardware events or handler related events may be utilized.

Once an event is detected, then in flow 420 a third register is updated to a state value to indicate the handler event of the plurality of handler events was detected. Here, once the hardware detects the event, then reporting logic reports the event to the status register. As an example, a bit corresponding to the handler event is set in a bit vector held in the third register to report the occurrence of the handler event. The third register may be readable by user-level software, so a handler is able to determine what handler event was detected. Note the third register, or other registers in conjunction with the third register, may provide additional information regarding the handler event, such as an operation associated with the event, a register associated with the event, and an address/data item associated with the event.

Before vectoring execution to the handler, a current program counter value or instruction pointer value/address is written to a fourth register in flow 425 to enable return to the current execution point after execution of the handler. Based on processor design an instruction pointer may reference a current instruction or a next instruction. Therefore, in both implementations reference to a "current instruction pointer" includes the current instruction pointer value, which may be a current or next instruction. As an example, a virtual address and offset to reference an address of the appropriate instruction is stored in the register.

In flow 430, execution is jumped to the handler address held in the first register. Continuing the example from above, a jump-type operation is executed to jump to the virtual address plus the offset held in the first register. Essentially, in flow 425 the current instruction pointer is logged and in flow 430 the current instruction pointer is replaced with an "instruction pointer" to the starting instruction of the transactional handler.

In flow 435, the transactional handler is executed to handle the event or events accordingly. As stated above, the handler may be able to access registers, such as the third register to determine the detected event, the event type, an address or operation associated with the event, or other handler related information. After the event is handled, then in flow 440 execution jumps back to the instruction pointer address held in the fourth register. As an inverse to the discussion above, the instruction pointer within the handler is now replaced with the previous logged instruction pointer. As a result, execution is vectored back to the point immediately before the handler was invoked. In one embodiment, the software handler, in response to an abort or commit, may cause execution to be vectored back to a different point.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    a first storage element, which is adapted to be modifiable by non-privileged software to hold a reference to a transactional handler and a plurality of handler events, the first storage element to hold a bit vector with each bit of the bit vector corresponding to one of the plurality of handler events, and wherein each bit corresponding to a handler event is to be set by the non-privileged software to enable an execution circuit to vector execution to the transactional handler in response to an occurrence of the handler event;
    a second storage element to hold a status value to indicate the handler event that is to be handled by the transactional handler upon the occurrence of the handler event; and
    the execution circuit coupled to the first storage element, the execution circuit to execute a transaction and to vector execution from the transaction to the transactional handler with a skid as low as zero, without software polling, and without intervention from privileged software, based on the reference to the transactional handler to be held in the first storage element in response to the occurrence of the handler event; and
    wherein the handler event is selected from a plurality of events consisting of an execution of an instruction that is illegal within a transaction's scope, an access to a non-checkpointed register, an access to a memory type forbidden in the transaction's scope, a system call, and an illegal control transfer.

2. The apparatus of claim 1, wherein the first storage element includes a register, and wherein the reference to the transactional handler includes a virtual address.

3. The apparatus of claim 2, wherein the execution circuit vectoring execution from the transaction to the transactional handler comprises the execution circuit performing a jump type of operation with a target address associated with the virtual address and an offset.

4. The apparatus of claim 1, wherein the non-privileged software includes transactional runtime code.

5. The apparatus of claim 1, wherein the plurality of events further includes an asynchronous handler event.

6. The apparatus of claim 1, wherein the plurality of events further includes a synchronous handler event.

7. The apparatus of claim 1, wherein the plurality of events further consists of a lack of attribute information, a loss of attribute information, a loss of monitored data, and a loss of buffered data.

8. The apparatus of claim 1, further comprising a third storage element to be readable by the non-privileged software, wherein the third storage element to hold a status value to specify the handler event causing the execution circuit to vector execution to the transactional handler.

9. The apparatus of claim 8, further comprising a fourth storage element to be updated with a reference to a current instruction pointer before the execution circuit vectors execution from the transaction to the transactional handler.

10. The apparatus of claim 9, wherein in response to the transactional handler handling the handler event the execution circuit to execute a jump-type instruction using the reference stored in the fourth storage element as the target to return execution to the transaction.

11. A storage device including user-level code, which, when executed, causes a machine to perform the operations of:
    registering a transactional handler to associate the transactional handler with a transaction in the user-level code;
    associating the transactional handler with a handler event of a plurality of handler events stored in a storage element, the plurality of handler events comprising an execution of an instruction that is illegal within a transaction's scope, an access to a non-checkpointed register, an access to a memory type forbidden in the transaction's scope, a system call, and an illegal control transfer, wherein the storage element is to hold a bit vector with each bit of the bit vector corresponding to one of the plurality of handler events, and wherein a bit corresponding to the handler event is to be set by the user-level code to enable an execution circuit to vector execution to the transactional handler in response to an occurrence of the handler event; and
    transferring a control flow to the transactional handler, the transfer to occur with a skid as low as zero, without software polling, and without intervention of privileged level software, in response to the handler event occurring during execution of the transaction based on the transactional handler being associated with the handler event.

12. The storage device of claim 11, wherein registering the transactional handler includes writing an address of the transactional handler to a register in a processor.

13. The storage device of claim 12, wherein transferring control flow to the transactional handler without software polling and without intervention of privileged level software comprises performing a first jump-type operation utilizing the address of the transactional handler.

14. The storage device of claim 13, wherein the user-level code, when executed, further causes the machine to perform the operations of before performing the jump-type operation utilizing the address of the transactional handler updating a return register with a reference to an instruction pointer address at a current point immediately before performing the first jump type operation.

15. The storage device of claim 14, wherein the user-level code, when executed, further causes the machine to perform the operations of performing a second jump-type operation utilizing the instruction pointer address from the reference to the instruction pointer address held in the return register to return to the current point immediately before the first jump type operation.

16. The storage device of claim 11, wherein the plurality of events further includes an asynchronous event selected from a group consisting of a lack of attribute information, a loss of attribute information, and a loss of buffered data.

17. The storage device of claim 11, wherein the plurality of events further includes a synchronous event.

18. The storage device of claim 11, wherein the privileged level software includes software selected from a group consisting of operating system software, kernel software, and virtual machine monitor (VMM) software.

19. An apparatus comprising:
a handler register to be updated by user-level software, the handler register to hold a reference to a transactional handler;
an event register to be updated by the user-level software to specify a plurality of handler events, wherein the plurality of handler events are each individually selected from a plurality of handler events comprising an execution of an instruction that is illegal within a transaction's scope, an access to a non-checkpointed register, an access to a memory type forbidden in the transaction's scope, a system call, and an illegal control transfer;
a status register to hold a status value to indicate the handler event to be handled by the transactional handler upon an occurrence of one of the plurality of the handler events; and
an execution circuit to vector execution from a transaction to the transactional handler with a skid as low as zero, without software polling, and without intervention of privileged level software, in response to detecting the occurrence of the handler event of the plurality of handler events.

20. The apparatus of claim 19, wherein the privileged level software intervention includes Operating System (OS) intervention.

21. The apparatus of claim 20, wherein the non-privileged software is selected from a group consisting of transactional runtime software, application code including the transaction, and virtual machine code.

22. The apparatus of claim 19, wherein the plurality of handler events further includes an asynchronous handler event and a synchronous handler event.

23. A system comprising:
a processor including a user-addressable first register to hold a reference to a transactional handler, a user-addressable second register to hold a bit vector with each bit of the bit vector to enable one of a plurality of handler events, the plurality of handler events comprising an execution of an instruction that is illegal within a transaction's scope, an access to a non-checkpointed register, an access to a memory type forbidden in the transaction's scope, a system call, and an illegal control transfer, a user-readable third register to hold a status of what events of the plurality of handler events were detected, a fourth register to hold a current instruction location within a transaction, and an execution circuit coupled to the four registers, wherein, in response to an enabled handler event during execution of a transaction, the execution circuit is to:
update the fourth register with a reference to the current instruction location within the transaction;
update the third register with the status of what events were detected;
direct control flow to the transactional handler with a skid as low as zero, without software polling, and without intervention from a privileged level software entity, based on the reference to the transactional handler held in the first register to handle the handler event; and
direct control flow back to the current instruction location based on the reference to the current instruction location held in the fourth register after execution of the transactional handler to handle the handler event, and wherein a bit of the second register enabling the handler event is to be set by a non-privileged software to enable the execution circuit to vector execution to the transactional handler in response to an occurrence of one of the handler events; and
an input/output (I/O) device coupled to the processor.

24. The system of claim 23, wherein the reference to the transactional handler includes a virtual address and an offset, when translated to a physical address, to reference a starting physical address of the transactional handler.

25. The system of claim 24, wherein user-level code including the transaction, when executed, is to load the user-addressable first register with the virtual address and the offset before execution of the transaction.

26. The system of claim 23, wherein the reference to the current instruction location within the transaction includes a reference to an instruction pointer address associated with the current instruction location, and wherein the execution circuit to direct control flow back to the current instruction location based on the reference to instruction pointer address held in the fourth register comprises the execution circuit to execute a return jump operation with the instruction pointer address as a return target address.

27. The system of claim 26, wherein the execution circuit to direct control flow to the transactional handler based on the reference to the transactional handler held in the user-addressable first register to handle the handler event comprises the execution circuit to execute a jump operation with a target address associated with the reference to the transactional handler held in the user-addressable first register as a target address.

28. A method comprising:
registering a transactional handler with non-privileged level software in hardware of a processor;
associating a handler event with the transactional handler in hardware of the processor with the non-privileged level software, wherein the handler event is one of a plurality of handler events that may be set by the non-privileged level software to enable an execution circuit to vector execution to the transactional handler in response to an occurrence of the handler event, the plurality of handler events comprising an execution of an instruction that is illegal within a transaction's scope, an access to a non-checkpointed register, an access to a memory type forbidden in the transaction's scope, a system call, and an illegal control transfer;
detecting the handler event during execution of a transaction with the processor;
directing a control flow from execution of the transaction to execution of the transactional handler in hardware with a skid as low as zero, without software polling, and without intervention of privileged-level software; and returning the control flow to execution of the transaction without intervention of the privileged level software after handling the handler event with the transactional handler.

29. The method of claim 28, wherein registering the transactional handler with non-privileged level software in hardware of the processor comprises loading a first register with a representation of an address associated with the transactional handler.

30. The method of claim 29, further comprising storing an instruction pointer address in a fourth register before directing the control flow from execution of the transaction to execution of the transactional handler, wherein the instruction pointer address corresponds to an instruction pointer value before directing the control flow to execution of the transactional handler.

31. The method of claim 30, wherein directing the control flow from execution of the transaction to execution of the transactional handler in hardware without software polling and without intervention of privileged-level software comprises jumping execution to the address associated with the transactional handler without intervention of the privileged level software for execution of the transactional handler.

32. The method of claim 31, wherein returning the control flow to execution of the transaction without intervention of the privileged level software after handling the handler event with the transactional handler comprises jumping execution to the instruction pointer address stored in the fourth register without intervention of the privileged level software after handling the handler event with the transactional handler.

33. The method of claim 30, further comprising enabling the handler event with the non-privileged level software by setting a bit in a second register before detecting the handler event, the second register to hold a vector of bits, with each bit to enable one of the plurality of handler events.

34. The method of claim 33, further comprising updating a third register to hold a status of the detected handler event before directing the control flow from execution of the transaction to execution of the transactional hardware in response to detecting the handler event, wherein the third register to hold a vector of bits, with each bit to provide status of one of the plurality of handler events.

* * * * *